United States Patent
Prucher

(10) Patent No.: US 7,155,824 B2
(45) Date of Patent: Jan. 2, 2007

(54) METHOD OF MANUFACTURING AN AUTOMOTIVE DIFFERENTIAL HAVING AN INPUT PINION

(75) Inventor: Bryan P. Prucher, Clarkston, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 457 days.

(21) Appl. No.: 10/802,673

(22) Filed: Mar. 17, 2004

(65) Prior Publication Data

US 2004/0226170 A1 Nov. 18, 2004

Related U.S. Application Data

(63) Continuation-in-part of application No. 09/930,611, filed on Aug. 15, 2001, now abandoned.

(51) Int. Cl.
 *B21D 53/28* (2006.01)
 *B21K 1/30* (2006.01)
(52) U.S. Cl. .............. 29/893.1; 29/893.2; 29/893.3; 29/893.37
(58) Field of Classification Search .......... 29/893.2, 29/893.3, 893.1, 893.37, 893.32
 See application file for complete search history.

(56) References Cited

U.S. PATENT DOCUMENTS

| | | | |
|---|---|---|---|
| 3,394,610 A | 7/1968 | Szodfridt | |
| RE27,126 E | 5/1971 | Gingery | |
| 3,792,625 A | 2/1974 | Asberg | |
| 4,000,392 A * | 12/1976 | Banas et al. | 219/121.63 |
| 4,006,993 A | 2/1977 | Woerlee | |
| 4,394,421 A | 7/1983 | Chmura et al. | |
| 4,856,166 A | 8/1989 | Miwa | |
| 4,856,167 A * | 8/1989 | Sabroff et al. | 29/893.34 |
| 4,983,797 A | 1/1991 | McAllister et al. | |
| 5,056,213 A | 10/1991 | Behnke et al. | |
| 5,070,745 A | 12/1991 | Lindsey et al. | |
| 5,250,123 A * | 10/1993 | Yashiki et al. | 148/111 |
| 5,360,963 A | 11/1994 | Storm et al. | |
| 5,390,414 A | 2/1995 | Lisowsky | |
| 5,503,494 A | 4/1996 | Kamata et al. | |
| 5,516,376 A | 5/1996 | Tsukamoto et al. | |
| 5,527,400 A | 6/1996 | Smith et al. | |
| 5,655,987 A | 8/1997 | Bowerman et al. | |
| 5,718,774 A | 2/1998 | Tukamoto et al. | |
| 5,806,373 A * | 9/1998 | Parker | 74/432 |
| 5,829,911 A | 11/1998 | Yokota et al. | |
| 5,896,776 A | 4/1999 | Handa et al. | |
| 6,041,640 A | 3/2000 | McInerney et al. | |

(Continued)

FOREIGN PATENT DOCUMENTS

DE 2017709 11/1971

(Continued)

OTHER PUBLICATIONS

Kirby, Jun. 1993, "Shrink Bonding Makes Joints Stronger", pp. 35-37.

(Continued)

*Primary Examiner*—Marc Jimenez
(74) *Attorney, Agent, or Firm*—Harness, Dickey & Pierce, P.L.C.

(57) ABSTRACT

A method for fabricating an input pinion for an automotive differential that includes: providing a shaft; forging a pinion with a plurality of teeth such that each tooth is formed to at least a near-net size, forming a hole in the pinion, pressing an end of the shaft into the hole in the pinion, and securing the shaft to the pinion.

29 Claims, 5 Drawing Sheets

U.S. PATENT DOCUMENTS 6,210,299 B1    4/2001    Yoshioka
2002/0134182 A1    9/2002    Schleuder et al.

FOREIGN PATENT DOCUMENTS

| GB | 1350995 | 4/1974 |
|---|---|---|
| JP | 60-84472 | 5/1985 |
| JP | 06-117518 | 4/1994 |
| WO | WO/8804743 | 6/1998 |

OTHER PUBLICATIONS

Michalec, Jun. 1966, "Fastening Gears", pp. 139-143.

* cited by examiner

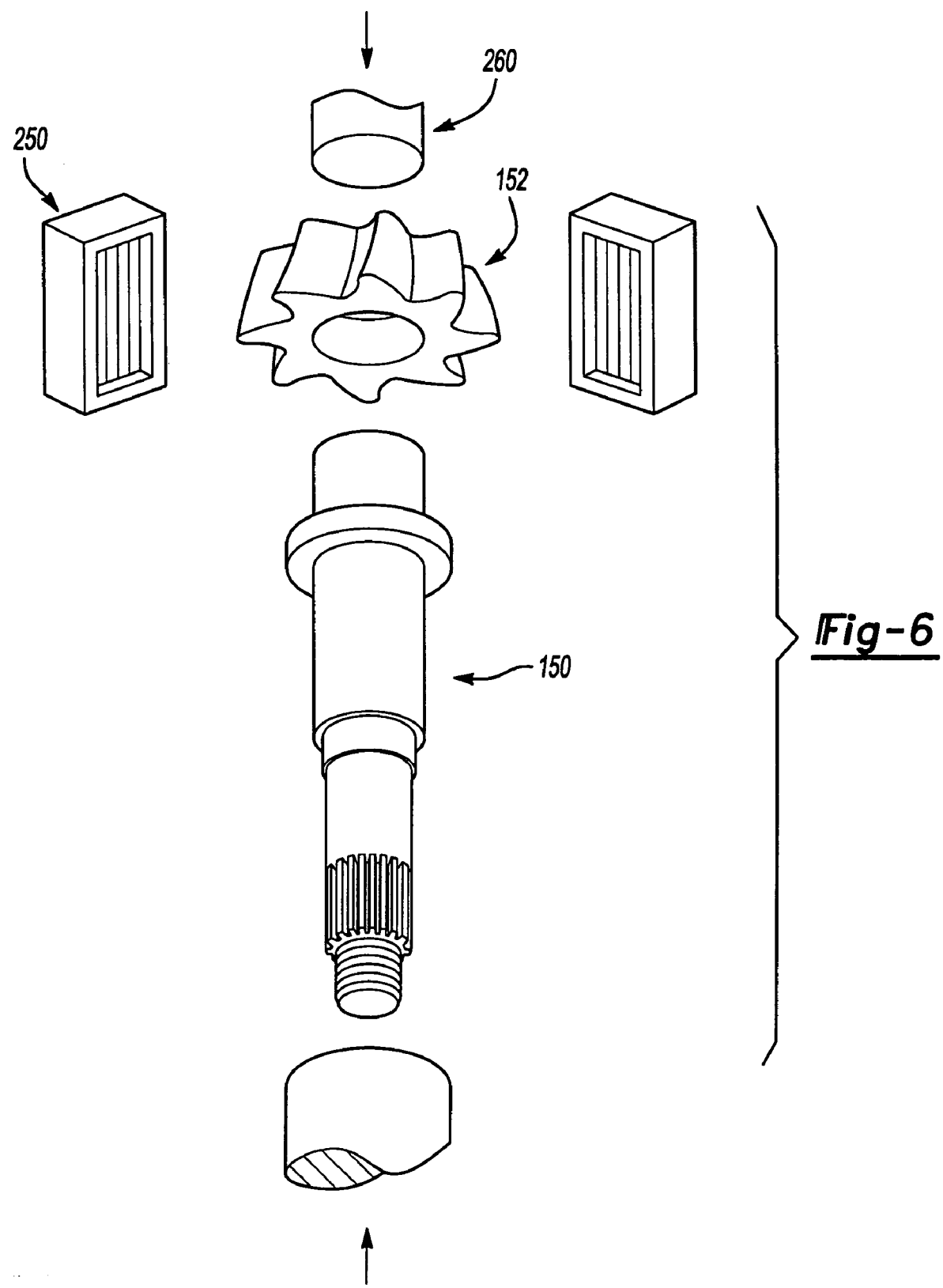

ME THOD OF MANUFACTURING AN AUTOMOTIVE DIFFERENTIAL HAVING AN INPUT PINION

CROSS-REFERENCE TO RELATED APPLICATIONS

This is a continuation-in-part of U.S. patent application Ser. No. 09/930,611 filed Aug. 15, 2001, now abandoned.

FIELD OF THE INVENTION

The present invention generally relates method for manufacturing an input pinion that is adapted for use in vehicle differentials.

BACKGROUND OF THE INVENTION

As is well known in the art, the fabrication of a typical input pinion for an automotive differential assembly is complex and costly and as such, greatly adds to the cost of the differential assembly. A typical process for forming an input pinion includes forging of the gear and shaft, annealing, straightening, rough machining, carburizing, hardening and finish machining operations. Additionally, the input pinion may be processed through a lapping operation wherein the teeth of the input pinion are lapped with the teeth of the ring gear to match the input pinion and ring gear to one another. The lapping operation matches the input pinion and the ring gear to one another, necessitating that they be installed as a set to a given differential assembly. Despite the almost universal use of such forming processes, several drawbacks have been noted.

One such drawback relates to the initial forming of the input pinion through forging. As those skilled in the art will appreciate, the input pinion is typically blanked or rough-formed in a forging operation from a solid billet of steel. This forging operation is relatively complex due to the shape of the input pinion and as such, the tooling for the forging operation is generally complex and expensive.

Another such drawback concerns the machining of the input pinion. The numerous machining operations that are performed on the input pinion typically account for more 70% of the total cost of the input pinion. Furthermore, the protracted nature of the machining operations often results in an average cycle time that exceeds one or more days in length.

Yet another drawback concerns the material from which the input pinion is formed. Typically, the steel billet from which the input pinion is formed is a low carbon steel having characteristics that are particularly well suited to both forging and machining. Such steels, however, generally lack the strength that is desired for an input pinion and as such, a time consuming and costly carburization process is typically employed to create a layer of relatively high carbon steel on the surface of the input pinion. Carburization usually entails the placement of semi-finished input shafts into a heated, high-carbon environment for an extended period of time to permit carbon to migrate into the input shaft to a predetermined depth. The input pinion is subsequently heat treated so that the high carbon layer provides a level of strength and durability that is commensurate with the intended application.

Accordingly, there remains a need in the art for an improved input pinion manufacturing method that permits increased flexibility in the design of the input pinion that facilitates application specific customization and the adaptation of lower cost processes for its manufacture.

SUMMARY OF THE INVENTION

In one form, the present teachings provide a method for fabricating an input pinion for an automotive differential. The method includes: providing a shaft; forging a pinion, the pinion including a plurality of teeth, each tooth being formed in the forging step to at least a near-net size; forming a round hole in the pinion; pressing a cylindrical end of the shaft into the hole in the pinion; and securing the shaft to the pinion.

In another form, the present teachings provide a method for fabricating an input pinion for an automotive differential. The method includes: providing a tubular shaft; roll forming a set of splines and a set of threads onto the tubular shaft; forging a pinion, the pinion including a plurality of teeth, each tooth being formed in the forging step to at least a near-net size; forming a round hole in the pinion; pressing a cylindrical end of the tubular shaft into the hole in the pinion; and laser welding the tubular shaft to the pinion In yet another form, the present teachings provide a method for fabricating an input pinion for an automotive differential. The method includes: providing a tubular shaft; roll forming the tubular shaft to define a plurality of spline teeth and a set of threads; forging a pinion, the pinion including a plurality of teeth, each tooth being formed in the forging step to a size that is larger than a desired tooth size by an amount that is less than or equal to about 0.04 inch; performing at least one of a grinding operation and a honing operation to machine the teeth of the pinion to the desired tooth size; forming a round hole in the pinion; pressing a cylindrical end of the tubular shaft into the hole in the pinion to fixedly couple the pinion and the tubular shaft to one another; induction heating the pinion and the tubular shaft to heat-treat both a plurality of teeth that are formed on the pinion and at least one portion of the tubular shaft; and laser welding the tubular shaft to the pinion Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

FIG. 6 is a schematic illustration of an assembly press and induction heater for heat treating the gear and assembling the stem and the gear.

DETAILED DESCRIPTION OF THE PREFERRED EMBODIMENTS

Figure 1:
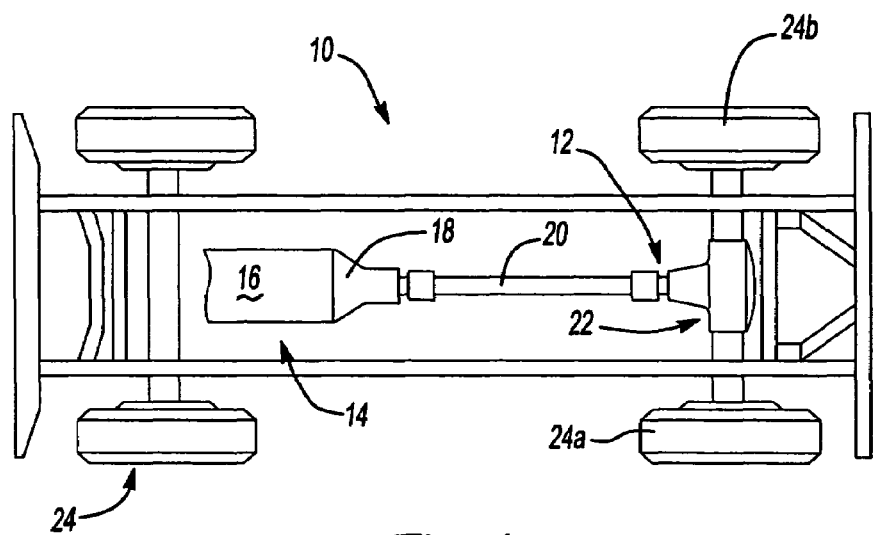
FIG. 1 is a schematic illustration of a motor vehicle constructed in accordance with the teachings of the present invention.

With reference to FIG. 1 of the drawings, a vehicle having a differential assembly that is constructed in accordance with the teachings of the present invention is generally indicated by reference numeral 10. The vehicle 10 may include a driveline 12 that is drivable via a connection to a power train 14. The power train 14 may include an engine 16 and a transmission 18. The driveline 12 may include a drive shaft 20, a rear axle 22 and a plurality of wheels 24. The engine 16 may be mounted in an in-line or longitudinal orientation along the axis of the vehicle 10 and its output may be selectively coupled via a conventional clutch to the input of the transmission 18 to transmit rotary power (i.e., drive torque) therebetween. The input of the transmission 18 may be commonly aligned with the output of the engine 16 for rotation about a rotary axis. The transmission 18 may also include an output and a gear reduction unit. The gear reduction unit may be operable for coupling the transmission input to the transmission output at a predetermined gear speed ratio. The drive shaft 20 may be coupled for rotation with the output of the transmission 18. Drive torque may be transmitted through the drive shaft 20 to the rear axle 22 where it may selectively apportion in a predetermined manner to the left and right rear wheels 24a and 24b, respectively.

Figure 2:
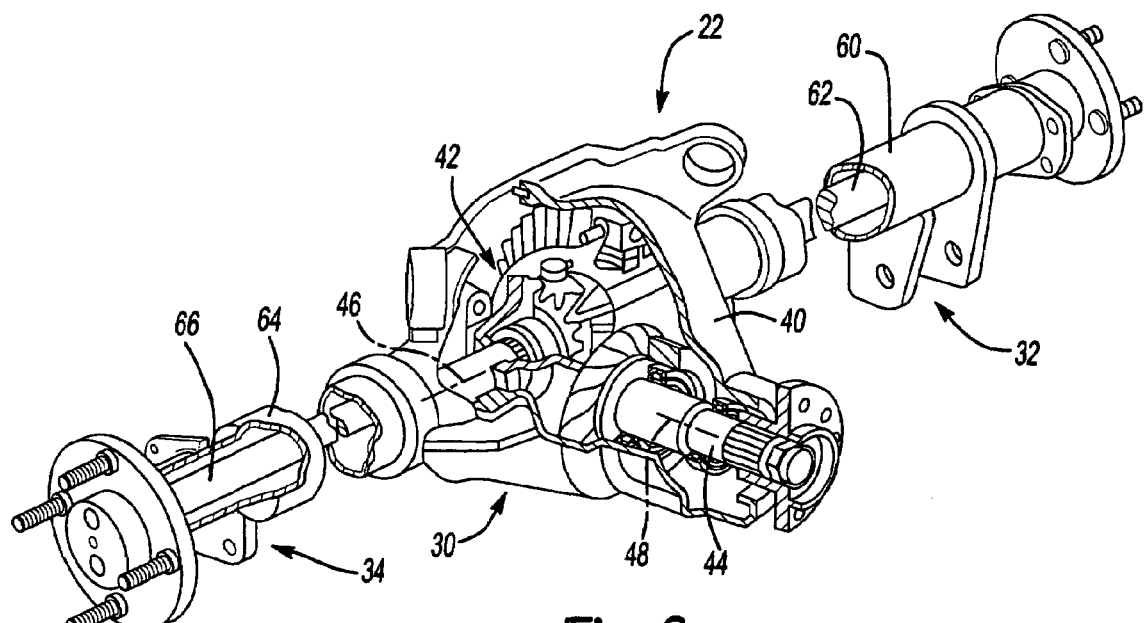
FIG. 2 is a cut-away perspective view of a portion of the motor vehicle of FIG. 1, illustrating the rear axle in greater detail.
Figure 3:
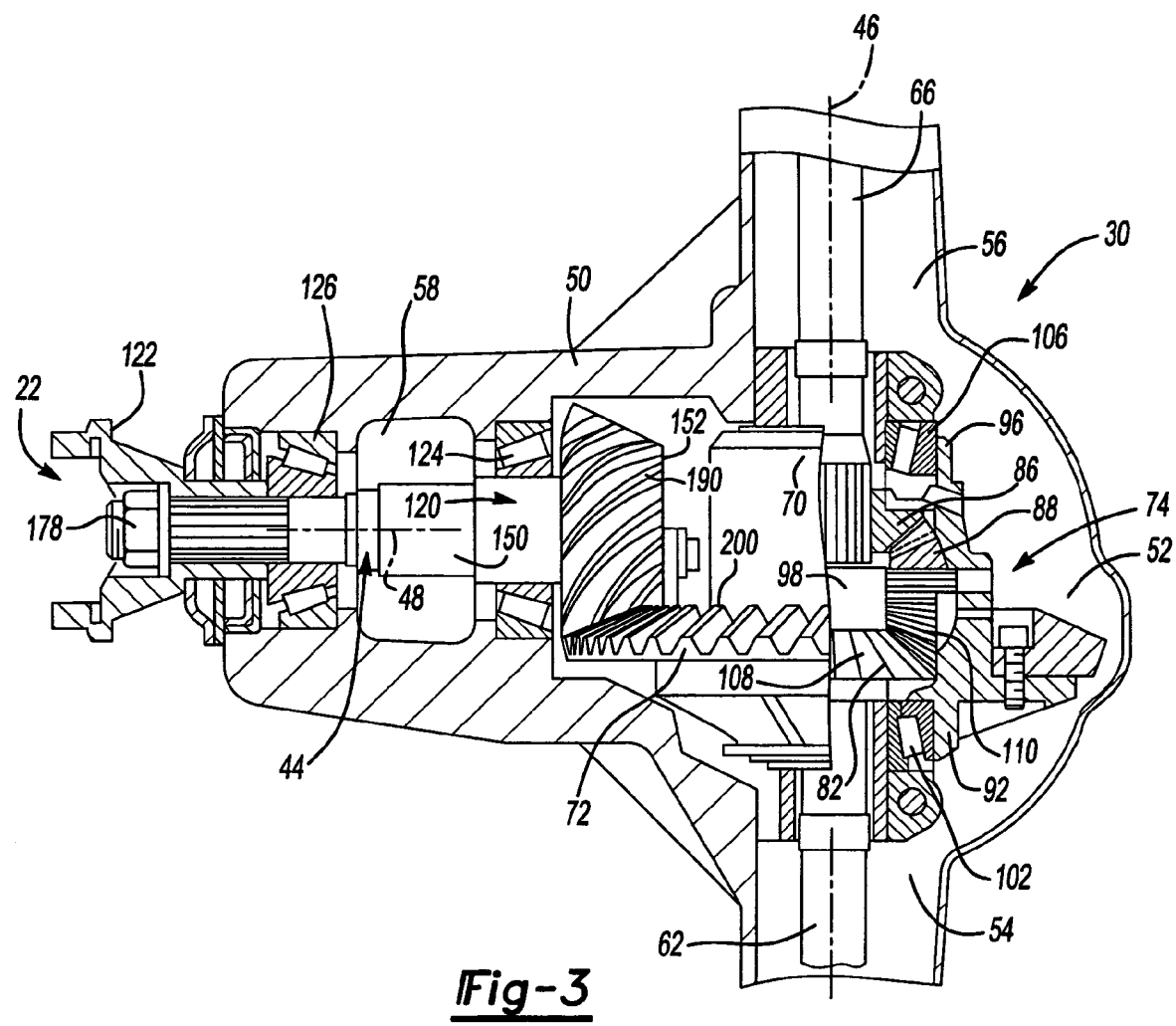
FIG. 3 is a section view of a portion of the rear axle illustrated in FIG. 2.

With additional reference to FIGS. 2 and 3, the rear axle 22 may include a differential assembly 30, a left axle shaft assembly 32 and a right axle shaft assembly 34. The differential assembly 30 may include a housing 40, a differential unit 42 and an input shaft assembly 44. The housing 40 may support the differential unit 42 for rotation about a first axis 46 and may further support the input shaft assembly 44 for rotation about a second axis 48 that may be perpendicular to the first axis 46.

The housing 40 may be initially formed in a suitable casting process and thereafter machined as required. The housing may includes a wall member 50 that may define a central cavity 52 having a left axle aperture 54, a right axle aperture 56, and an input shaft aperture 58.

The left axle shaft assembly 32 may include a first axle tube 60 fixed to the left axle aperture 54 and a first axle half-shaft 62 that may be supported for rotation in the first axle tube 60 about the first axis 46. Similarly, the right axle shaft assembly 34 may include a second axle tube 64 that may be fixed to the right axle aperture 56 and which may support a second axle half-shaft 66 for rotation about the first axis 46.

The differential unit 42 may be disposed within the central cavity 52 of the housing 40 and may include a case 70, a ring gear 72 that may be fixed for rotation with the case 70, and a gearset 74 that may be disposed within the case 70. The gearset 74 may include first and second side gears 82 and 86 and a plurality of differential pinions 88, which may be rotatably supported on pinions 90 that may be mounted to the case 70. The case 70 may include a pair of trunnions 92 and 96 and may define a gear cavity 98. A pair of bearing assemblies 102 and 106 may be employed to support the trunnions 92 and 96, respectively, for rotation about the first axis 46. The first axle half shaft 62 and the second half shaft 66 may extend through the left and right axle apertures 54 and 56, respectively, where they may be coupled for rotation about the first axis 46 with the first and second side gears 82 and 86, respectively. The case 70 may be operable for supporting the plurality of differential pinions 88 for rotation within the gear cavity 98 about one or more axes that are perpendicular to the first axis 46. The first and second side gears 82 and 86 may each include a plurality of teeth 108 which may meshingly engage teeth 110 that are formed on the differential pinions 88.

The input shaft assembly 44 may extend through the input shaft aperture 58 and may include an input pinion 120, a conventional prop shaft coupling flange 122 and a pair of conventional bearing assemblies 124 and 126. Each of the bearing assemblies 124 and 126 may include an outer race that may engage the housing 40 in a press-fit manner. The bearing assemblies 124 and 126 may cooperate with the housing 40 to support the input pinion 120 for rotation about the second axis 48 in the input shaft aperture 58.

Figure 4A:
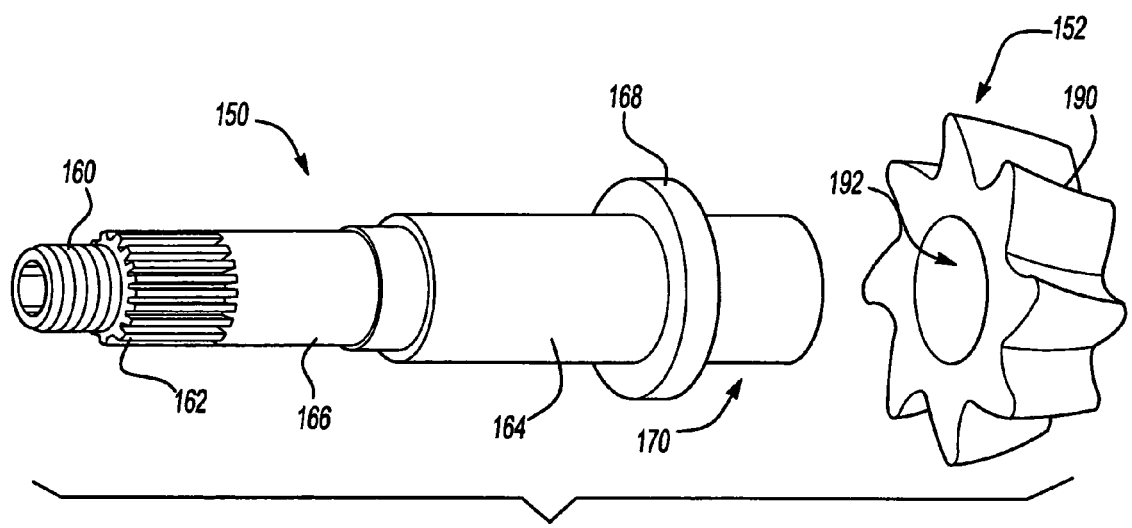
FIG. 4A is an exploded perspective view of a portion of the rear axle, illustrating the input pinion in greater detail.
Figure 4B:
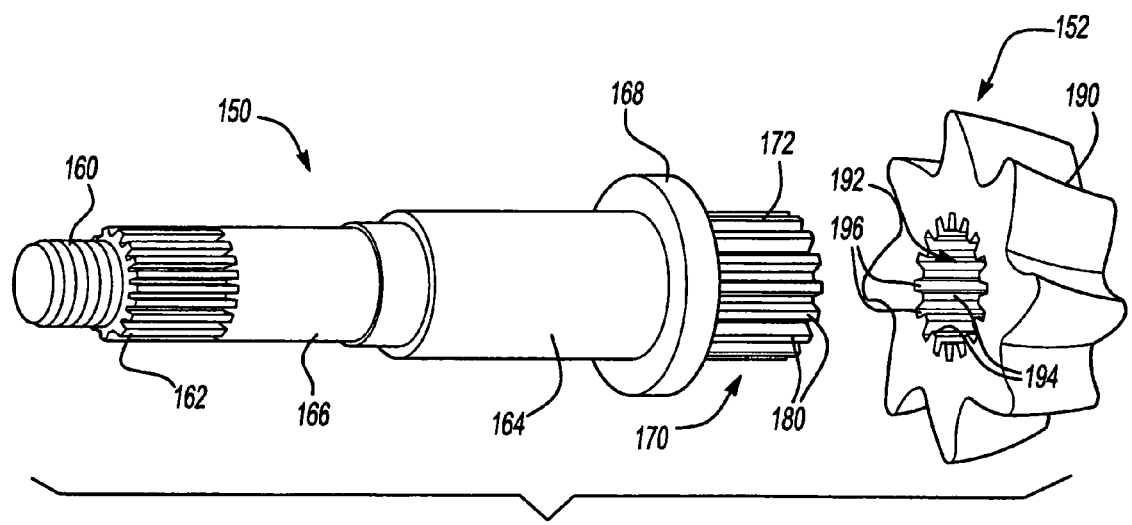
FIG. 4B is an exploded perspective view similar to that of FIG. 4A but illustrating a different coupling means for coupling the stem and the gear.
Figure 5A:
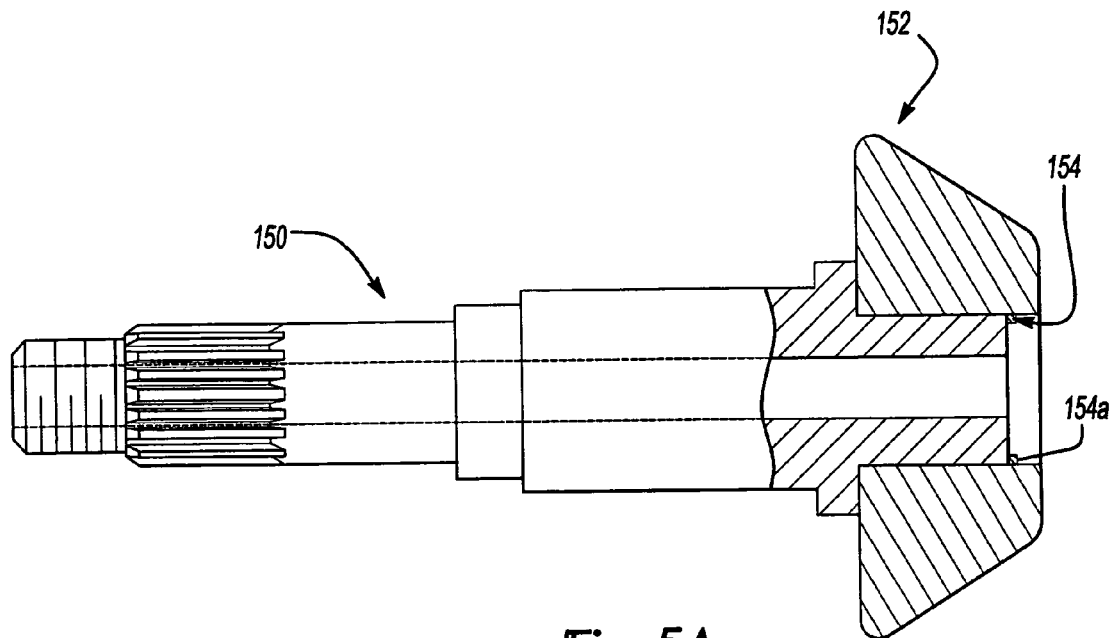
FIG. 5A is a section view taken along the longitudinal axis of the input pinion illustrated in FIG. 4A.

With additional reference to FIGS. 4A and 5A, the input pinion 120 may include a stem 150 and a gear 152 that are fixedly coupled to one another via an appropriate coupling means 154. The stem 150 may be formed from a first material, such as SAE 1050 steel, CPM-15V steel, CPM-15V41Ti steel or another suitable material, and may have a construction that is solid (FIG. 4B) or hollow (FIG. 4A). CPM-15V steel and CPM-15V41Ti steel may be obtained from Crucible Material Corporation of Syracuse, N.Y. The austenitic grain size of the CMP-15V steel may be 5 or finer and the chemical composition of CPM-15V steel may be as follows: C: 0.36%–0.44%; Mn: 1.35%–1.65%; Si: 0.15%–0.35%; and V: 0.035%–0.085%. The austenitic grain size of the CMP-15V41Ti steel may be 5 or finer and the chemical composition of CPM-15V41Ti steel may be as follows: C: 0.38%-0.44%; Mn: 1.35%–1.65%; P: 0.03% maximum; S: 0.04% maximum; Si: 0.15%–0.35%; V: 0.08%–0.12%; Ti: 0.01%–0.02%; and N: 130 ppm–170 ppm. Unless noted otherwise, percentages expressed herein and in the claims are weight percentages that are calculated in accordance with well known steel industry practices.

The stem 150 may include a threaded end portion 160, an input spline 162, first and second bearing surfaces 164 and 166, respectively, an annular gear flange 168, and a shaft portion 170 having an engagement surface 172. In the case where the stem 150 is hollow, it is preferably formed from a piece of extruded or seamless-welded tubing (rather than machined from a solid bar) and formed in one or more roll forming operations that are employed to selectively alter the configuration of the wall of the tubing in a predetermined manner.

The input spline 162 may be sized to meshingly engage a splined aperture 176 that is formed through the prop shaft coupling flange 122. Engagement of the input spline 162 to the splined aperture 176 may facilitate the transmission of drive torque from the drive shaft 20 to the stem 150. A conventional threaded nut 178 may be threadably engaged to the threaded end portion 160 to fixedly secure the prop shaft coupling flange 122 to the stem 150.

The first and second bearing surfaces 164 and 166 may be near-net formed or oversized relative to the inner bearing races of the bearings 124 and 126 such that a predetermined amount of finish stock is present. The finish stock may be removed in a subsequent finishing operation, such as a grinding operation. Alternatively, the first and second bearing surfaces 164 and 166 may be net formed in a suitable machining operation, such as in a turning, grinding, or roll forming operation. The annular gear flange 168 may abut the shaft portion 170 and extends radially outwardly therefrom.

The configuration of the shaft portion 170 is dependent upon the amount of torque that is to be transmitted through the input shaft assembly 44. The shaft portion 170 may be configured with a cross-section that is uniformly circular in shape, thereby providing the engagement surface 172 with a corresponding cylindrical shape. Configuration in this manner is preferred for ease of manufacture and assembly. Alternatively, the shaft portion 170 may be configured with a non-circular cross-section, such as that shown in FIGS. 4B and 5B. In this example, a plurality of circumferentially spaced spline teeth are formed into the perimeter of the shaft portion 170 to thereby provide the engagement surface 172 with a series of lands and valleys. Those skilled in the art will readily understand that the shaft portion 170 and the engagement surface 172 may have other configurations. For example, lobes may be formed onto the perimeter of the shaft portion 170, or the shaft portion 170 may be constructed with a non-circular shape, such as triangular, square or hexagonal.

With renewed reference to FIGS. 4A and 5A, the stem 150 may be cut from a billet having a generally cylindrical exterior, cold rolled to form its profile and heat-treated via induction hardening. Those skilled in the art will understand, however, that the profile of the stem 150 may be formed in any appropriate forming or machining process and that any appropriate heat-treating process may additionally be employed, either prior to or after the final machining of the stem 150, to provide the stem 150 with an appropriate level of strength and/or toughness.

The gear 152 may be formed the first material or alternatively, from a second material that is different than the first material, such as a conventional SAE 4340 steel, 15V41 micro alloy steel or another suitable high strength material. The gear 152 is illustrated to include a plurality of gear teeth 190 and a mounting aperture 192. The gear 152 may be initially formed in a forging operation and may thereafter be machined to size. Preferably, the gear 152 is at least near-net formed in a forging operation and thereafter at least partially finished in a chipless machining operation, such as roll forming. Near net-forming of the gear 152 entails the formation of the gear teeth 190 to a size that is less than or equal to about 0.04 inch (i.e., less than or equal to about 0.02 inch per side) greater than a desired tooth size and more preferably less than or equal to about 0.02 inch (i.e., less than or equal to about 0.01 inch per side) greater than a desired tooth size. Also preferably, the gear 152 is processed through a honing operation after the gear 152 has been processed through a post-forging machining operation (e.g., roll forming or hobbing). Honing is advantageous in that it greatly increases the strength of the gear 152 while simultaneously reduces the magnitude of the residual stresses within the gear 152. Alternatively, the gear 152 may be formed such that a predetermined amount of finish stock is present on the tooth profile of each of the gear teeth 190, which is thereafter removed in a conventional manner. The mounting aperture 192 may be sized to receive the shaft portion 170 and may include a contact surface 194 that is configured to engage the engagement surface 172 of the shaft portion 170 in a manner that facilitates the transmission of rotary power therebetween. In the example provided, the shaft portion 170 and the mounting aperture 192 are sized to engage one another such that the coupling means 154 includes an interference fit between the shaft portion 170 and the mounting aperture 192, typically in excess of about 0.001 inch to about 0.003 inch.

Figure 5B:
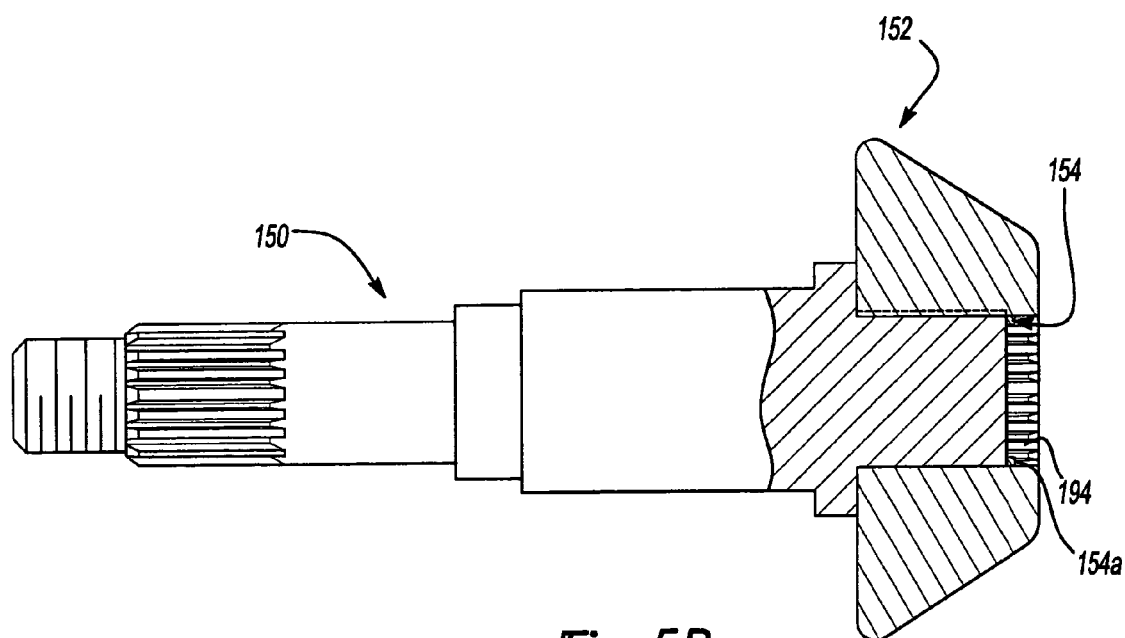
FIG. 5B is a section view taken along the longitudinal axis of the input pinion illustrated in FIG. 4B.

As those skilled in the art will understand, the magnitude of the interference may be a function of the amount of torque that is carried by the input shaft assembly 44. Where a significant amount of torque is to be carried by the input shaft assembly 44, mating features may be incorporated onto the shaft portion 170 and the mounting aperture 192 so as to facilitate the transmission of relatively larger levels of torque. For example, a plurality of spline apertures 196 which are sized to meshingly engage the spline teeth 180 may be formed into the mounting aperture 192 as illustrated in FIGS. 4B and 5B. Even when mating features are incorporated into the shaft portion 170 and mounting aperture 192, the shaft portion 170 and mounting aperture 192 may be sized to engage on another with some sort of interference fit (e.g., press fit or better).

According to one method of manufacture, the gear 152 is cut from a billet and warm-formed in a forging operation. The gear 152 may thereafter be machined to define the tooth profile of the gear teeth 190, to define and size the mounting aperture 192 and to form mating features into the mounting aperture 192 as necessary. Depending on the processes that are employed to form the gear 152, one or more heat treatment steps may be incorporated into the process prior to and/or after the machining of the gear 152. These heat treatment steps may include annealing, carburizing, induction hardening, and/or tempering.

Preferably, however, the gear 152 is cut from a billet, warm formed in an appropriate forging operation so as to near-net form both the gear teeth 190 and the mounting aperture 192. The gear 152 may be machined thereafter to further define the tooth profile of the gear teeth 190. The machining process may include a conventional chip-producing machining operation (e.g., hobbing) or a chipless machining operation, such as a roll forming. As mentioned above, the machining operation may include a honing operation that produces strong gear teeth 190 having relatively low residual stress. The mounting aperture 192 may be bored or otherwise sized. Depending on the geometry of any mating features that are included in the mounting aperture 192, it may be necessary to process the gear through a secondary machining operation, such as a broaching operation, to form features such as the spline apertures 196 that are illustrated in FIG. 4B.

Thereafter, the gear 152 may be heat-treated in an appropriate hardening process to harden the gear 152 or to selectively harden portions of the gear 152 (e.g., the gear teeth 190) as desired. Preferably, the gear 152 is heated in an induction heater 250 to permit this operation to be accomplished in a relatively short cycle time. In the area of the root 252 of the gear tooth 190, much of the heat energy that is produced by the induction heater 250 may be absorbed into the surrounding high-mass area of the gear 152 and as such, this area may not have the same hardness and/or may not be hardened to the same depth as the areas that are relatively further away (e.g., the peak of the tooth 190). In the cases where a relatively high hardness is required in the root area of the gear teeth 190, an increase in the energy that is output from the induction heater 250 may provide adequate hardening of the root area in some situations. This solution, however, may not be implementable in all cases since the additional heat that is produced may potentially damage the outlying portions of the gear tooth 190. Where additional heat cannot be used, a honing operation to at least partially finish the gear teeth 190 is highly advantageous in that the additional tooth strength that is obtained through honing may be sufficient so as to eliminate the need to harden the root area of the gear teeth 190 to any greater extent.

With the stem 150 and gear 152 initially formed in the manner described above, they are thereafter assembled such that the shaft portion 170 is engaged into the mounting aperture 192. In those applications where the coupling means 154 includes an interference fit, such as a shrink fit, the stem 150 and the gear 152 may be assembled in a press 260 immediately after the gear 152 has been heated for heat treatment. Thereafter, the gear 152 and the stem 150, as necessary, may be processed through the same or one or more additional heaters, such as induction heaters, to perform a heat treating and/or tempering operation on one or predetermined portions of the input pinion 120. For example, the induction heater in the press 260 may also be employed to heat treat the first and second bearing surfaces 164 and 166.

In the example illustrated, the gear 152 is abutted against the annular gear flange 168 and as such, the annular gear flange 168 is employed as a locating feature to position the gear 152 longitudinally on the stem 150. Also in the particular example illustrated, the coupling means 154 also includes a laser weld 154a that ensures the stem 150 and the gear 152 will remain fixedly coupled to one another. As discussed above, however, the engagement and contact surfaces 172 and 194 may be configured to transmit rotary power between the stem 150 and the gear 152. Accordingly, the laser weld 154a may not serve as the primary means for transferring rotary power between the stem 150 and the gear 152 in some situations and as such, may be relatively small in size in those situations so as to minimize the amount of heat that is delivered to the stem 150 and the gear 152 to generate the laser weld 154a. In our testing, we have found that failures of the input pinion 120 occur in areas outside the weld joint when a laser weld 154a that extends about the perimeter of the mounting aperture 192 with a nominal depth of about 0.3 inches is employed to secure the stem 150 and the gear 152 to one another. Those of ordinary skill in the art will appreciate from this disclosure that the nominal depth of the laser weld 154a may be different than about 0.3 inch and that the laser weld 154a may be a skip weld (i.e., a series of discrete weld segments that are spaced about the perimeter of the mounting aperture 192). Accordingly, the scope of the present invention is not limited by the depth and/or length of the laser weld 154a.

It may not be necessary to perform any machining operations on the input pinion 120 after the stem 150 and the gear 152 have been assembled to one another. However, it may be desirable in some situations to employ one or more finish grind operations after the stem 150 and the gear 152 have been assembled to finish the first and second bearing surfaces 164 and 166 and the gear teeth 190. In this regard, the first and second bearing surfaces 164 and 166 may be machined to a size that permits them to engage in a press-fit manner the inner bearing races of the bearing assemblies 124 and 126, respectively. Similarly, the gear teeth 190 may be machined to a size that permits them to engage the gear teeth 190 that are formed on the ring gear 72. In some cases, it may also be desirable to finish the gear teeth 190 after the stem 150 and the gear 152 have been assembled to ensure that the runout of the gear teeth 190 will be maintained within desired limits. Accordingly, operations such as grinding, honing or lapping may be employed after the stem 150 and the gear 152 have been assembled.

As noted above, the input pinion 120 is coupled for rotation with the drive shaft 20 and is operable for transmitting drive torque to the differential unit 42. More specifically, drive torque received by the stem 150 is transmitted to the gear teeth 200 on the ring gear 72 via the gear teeth 190 on the gear 152. Drive torque may be distributed through the differential pinions 88 to the first and second side gears 82 and 86 in a conventional manner that is well known in the art.

While several embodiments of the input pinion 12 of the present invention have been described thus far as including a coupling means 154 having a first portion, in which the engagement surface 172 is engaged to the contact surface 194, and a second portion, which includes, for example, mating geometric features or a laser weld, for preventing relative rotation between the engagement surface 172 and the contact surface 194, those skilled in the art will appreciate that the invention, in its broader aspects, may be constructed somewhat differently. For example, the second portion of the coupling means 154 may include, for example, a conventional key element, such as a Woodruff, parallel, taper, or Gib Head keys, or a threaded fastener. With regard to the keyed embodiment, as those skilled in the art will readily understand, the key is inserted into a key slot formed into the shaft portion 170 such that the key slot is generally parallel a longitudinal axis of the shaft portion 170 and the key slot extends through the engagement surface 172. A similar key slot is likewise formed into the gear 152 such that the key slot intersects the contact surface 194. The key is placed into the key slot in the shaft portion 170 and thereafter aligned to the key slot in the gear 152 prior to the assembly of the stem 150 and the gear 152. As those skilled in the art will appreciate, the width of the key slots is matched in an appropriate manner to the width of the key to prevent relative rotation of the stem 150 and the gear 152.

As another example, the second portion of the coupling means 154 may include a conventional threaded fastener, such as a bolt or a nut. As those skilled in the art will appreciate, the shaft portion 170 may be configured to include a threaded aperture that is generally coincident with the longitudinal axis of the stem 150. An appropriate threaded fastener, such as a conventional flange head bolt, may be threadably engaged to the threaded aperture and tightened to exert a clamping force on the gear 152. Alternatively, a portion of the stem 150 may be configured with a flange and a set of external threads that are spaced axially apart from the flange. The gear 152 is abutted against the flange and an internally threaded nut is threadably engaged to the set of external threads to generate a clamping force on the gear 152.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A method for fabricating an automotive differential having an input pinion, the method comprising:
   providing a tubular shaft;
   roll forming the tubular shaft to define a plurality of spline teeth;

machining a pair of axially spaced apart bearing surfaces onto the tubular shaft, each bearing surfaces being configured to engage an inner race of a bearing, the bearing surfaces being located between the spline teeth and an end of the tubular shaft opposite the spline teeth;

forging a pinion, the pinion including a plurality of teeth, each tooth being formed in the forging step to a size that is larger than a desired tooth size by an amount that is less than or equal to about 0.04 inch;

performing at least one of a machining operation, grinding operation and a honing operation to machine the teeth of the pinion to the desired tooth size;

forming a round hole in the pinion;

pressing a cylindrical end of the tubular shaft into the hole in the pinion to fixedly couple the pinion and the tubular shaft to one another;

induction heating the pinion and the tubular shaft to heat-treat both a plurality of teeth that are formed on the pinion and at least one portion of the tubular shaft;

laser welding the tubular shaft to the pinion; and meshing the pinion with a ring gear.

2. A method for fabricating an automotive differential having an input pinion, the method comprising:

providing a tubular shaft;

forging a pinion, the pinion including a plurality of teeth, each tooth being formed in the forging step to at least a near-net size;

forming a hole in the pinion;

pressing an end of the shaft into the hole in the pinion;

securing the shaft to the pinion;

machining a pair of axially spaced apart bearing surfaces onto the tubular shaft, each bearing surfaces being configured to engage an inner race of a bearing;

lapping the pinion after the pinion has been secured to the shaft; and meshing the pinion with a ring gear.

3. The method of claim 2, wherein the shaft is secured to the pinion with a laser weld.

4. The method of claim 3, wherein the laser weld has a depth of about 0.3 inches.

5. The method of claim 2, further comprising roll forming a set of threads onto the shaft, the set of threads being formed on an end of the shaft opposite the end on which the pinion is mounted.

6. The method of claim 2, wherein each tooth on the pinion is forged to a size that is larger than a desired tooth size by an amount that is less than or equal to about 0.04 inch.

7. The method of claim 6, wherein the amount by which each tooth on the pinion is forged larger than the desired tooth size is less than or equal to 0.02 inch.

8. The method of claim 2, further comprising performing at least one of a grinding operation and a honing operation to machine the teeth of the pinion to the desired tooth size.

9. The method of claim 2, further comprising induction heating the pinion and the shaft to heat-treat both the teeth that are formed on the pinion and at least one portion of the shaft.

10. The method of claim 9, wherein the pinion and the shaft are heat-treated after the shaft has been pressed into the hole in the pinion.

11. The method of claim 9, wherein a portion of the pinion that is located radially inward of the teeth is not hardened in the induction heating operation.

12. The method of claim 9, further comprising mounting a bearing to the portion of the shaft.

13. The method of claim 2, wherein the end of the shaft that is pressed into the pinion is cylindrically-shaped.

14. The method of claim 2, wherein the shaft is formed of a first material and the pinion is formed of a second material that is different than the first material.

15. The method of claim 14, wherein the second material comprises: about 0.38% to about 0.44% C, about 1.35% to about 1.65% Mn, about 0.03% maximum P, about 0.04% maximum S, about 0.15% to about 0.35% Si, about 0.08% to about 0.12% V; about 0.01% to about 0.02% Ti; and about 130 ppm to about 170 ppm N.

16. The method of claim 14, wherein the first material comprises: about 0.36% to about 0.44% C, about 1.35% to about 1.65% Mn, about 0.15% to about 0.35% Si; and about 0.035% to about 0.085% V.

17. The method of claim 2, wherein the hole in the pinion is round.

18. The method of claim 2, wherein the end of the shaft is formed with a shape that corresponds to a shape of the hole.

19. A method for fabricating an automotive differential having an input pinion, the method comprising:

providing a shaft;

roll forming a set of splines onto the shaft;

forging a pinion, the pinion including a plurality of teeth, each tooth being formed in the forging step to at least a near-net size;

forming a hole in the pinion;

pressing an end of the shaft into the hole in the pinion;

laser welding the shaft to the pinion;

machining a pair of axially spaced apart bearing surfaces onto the shaft, each bearing surfaces being configured to engage an inner race of a bearing, the bearing surfaces being located between the ends of the shaft;

lapping the pinion after the pinion and the shaft have been laser welded together; and meshing the pinion with a ring gear.

20. The method of claim 19, wherein each tooth on the pinion is forged to a size that that is larger than a desired tooth size by an amount that is less than or equal to about 0.04 inch.

21. The method of claim 20, wherein the amount by which each tooth on the pinion is forged larger than the desired tooth size is less than or equal to 0.02 inch.

22. The method of claim 19, further comprising performing at least one of a machining, grinding, and a honing operation to machine the teeth of the pinion to the desired tooth size.

23. The method of claim 19, further comprising induction heating the pinion and the shaft to heat-treat both the teeth that are formed on the pinion and at least one portion of the shaft.

24. The method of claim 19, wherein the pinion and the tubular shaft are heat-treated after the shaft has been pressed into the hole in the pinion.

25. The method of claim 19, wherein a portion of the pinion that is located radially inward of the teeth is not hardened in the induction heating operation.

26. The method of claim 19, further comprising mounting a bearing to the portion of the shaft.

27. The method of claim 19, wherein the hole in the pinion is round.

28. The method of claim 27, wherein the end of the shaft is formed with a shape that corresponds to a shape of the hole.

29. A method for fabricating an automotive differential having an input pinion, the method comprising providing a shaft, forging a pinion with a plurality of teeth such that each tooth is formed to at least a near-net size, forming a cylindrical hole in the pinion, pressing an end of the shaft into the cylindrical hole in the pinion, securing the shaft to the pinion, forming a pair of bearing surfaces on the shaft after the pinion has been secured to the shaft, lapping the pinion after it has been secured to the shaft, and meshing the pinion with a ring gear.

* * * * *